US008281309B2

(12) United States Patent
Meda et al.

(10) Patent No.: US 8,281,309 B2
(45) Date of Patent: Oct. 2, 2012

(54) OPTIMIZATION SYSTEM FOR CONTROLLING BATCH JOB PROCESSING TRAFFIC TRANSMITTED TO A MAINFRAME COMPUTER

(75) Inventors: Sushil R. Meda, Cumming, GA (US); Ginger Dusek, Chicago, IL (US); Nathaniel M. Holobinko, Avon, CT (US); Rishi Tank, Alpharetta, GA (US); Rahul Solan, Sandy Springs, GA (US); Keith Wright, Charlotte, NC (US)

(73) Assignee: Accenture Global Services Limited, Dublin (IE)

( * ) Notice: Subject to any disclaimer, the term of this patent is extended or adjusted under 35 U.S.C. 154(b) by 532 days.

(21) Appl. No.: 12/550,813

(22) Filed: Aug. 31, 2009

(65) Prior Publication Data

US 2011/0055834 A1     Mar. 3, 2011

(51) Int. Cl.
  *G06F 9/46*     (2006.01)
(52) U.S. Cl. ....................................................... 718/101
(58) Field of Classification Search .................... 718/101
  See application file for complete search history.

(56) References Cited

U.S. PATENT DOCUMENTS

| | | | | |
|---|---|---|---|---|
| 5,361,393 A | * | 11/1994 | Rossillo | 713/1 |
| 5,764,981 A | | 6/1998 | Brice et al. | |
| 5,774,668 A | | 6/1998 | Choquier et al. | |
| 6,112,183 A | * | 8/2000 | Swanson et al. | 705/2 |
| 6,952,819 B1 | * | 10/2005 | Wada et al. | 717/123 |
| 7,599,942 B1 | * | 10/2009 | Mohamad | 1/1 |
| 7,721,288 B2 | * | 5/2010 | Wu et al. | 718/101 |
| 7,765,549 B1 | * | 7/2010 | Lauer | 718/101 |
| 8,024,733 B2 | * | 9/2011 | Hambrick et al. | 718/101 |
| 2005/0132167 A1 | | 6/2005 | Longobardi | |
| 2005/0256826 A1 | | 11/2005 | Hambrick et al. | |
| 2006/0136279 A1 | | 6/2006 | Maybee et al. | |
| 2006/0242648 A1 | | 10/2006 | Guccione et al. | |
| 2008/0140675 A1 | | 6/2008 | Saito | |
| 2009/0006920 A1 | * | 1/2009 | Munson et al. | 714/748 |
| 2009/0031321 A1 | | 1/2009 | Ishizawa et al. | |

(Continued)

FOREIGN PATENT DOCUMENTS

WO     WO 02/101496     12/2002

OTHER PUBLICATIONS

Search Report from related European Patent Office Application No. 10007588.6-1238 dated Dec. 27, 2010.

(Continued)

*Primary Examiner* — Jennifer To
(74) *Attorney, Agent, or Firm* — Brinks Hofer Gilson & Lione

(57) ABSTRACT

A system for enrollment processing optimization for controlling batch job processing traffic transmitted to a mainframe computer includes an enrollment data input operations system operatively coupled to the mainframe computer and configured to provide a universal front end for data entry of enrollment information. Enrollment records based on the enrollment information is then created. A database system stores the enrollment records, and a workflow application module operatively coupled to the database system is configured to manage processing of the enrollment records and manage transmission of the enrollment records to the mainframe computer for batch processing. A batch throttling control module operatively coupled to the workflow application module and to the mainframe computer controls the rate and the number of enrollment records transmitted by the workflow application module to the mainframe computer for batch processing.

20 Claims, 11 Drawing Sheets

U.S. PATENT DOCUMENTS

| | | | |
|---|---|---|---|
| 2009/0193421 A1 | 7/2009 | Benedetti et al. | |
| 2010/0223557 A1* | 9/2010 | Kenney et al. | 715/736 |
| 2010/0287558 A1* | 11/2010 | Sandoz et al. | 718/103 |

OTHER PUBLICATIONS

Fritz Ferstl: "Job and Resource-Management Systems in Heterogeneous Clusters" Sep. 1995, Future Generation Computer Systems 12 (1996), pp. 39-51.

M. Giachetta et al.: "Catcher" Oct. 1994, Rivista de Informatica vol. XXV, 1995 (Partial translation only-first page).

"Microsoft Commerce Server 2000: Project Goals and Requirements", msdn, Internet publication; Microsoft Corporation, Jan. 31, 2001.

"Microsoft Commerce Server 2000: Site Development", msdn Internet publication; 2011 Microsoft Corporation, Jan. 31, 2001.

"Eliminate Traffic Jams", *Teredata Magazine*, Dec. 2007; AR-5477; pp. 1-3.

"Using TPump in an Active Warehouse Environment", Dr. Vincent Hager, Dec. 2002, PowerPoint Slide Nos. 1-48.

"Grainger and SAP Central Job Scheduling by Redwood", Internet Page from Redwood SAP TechEd 2006.

"SAP Central Job Scheduling by Redwood", SAP AG publication, pp. 1-28.

"Job Scheduling for SAP", K. Verruijt et al., Houton, 2006, SAP Press, pp. 1-2, 7-18, 199-303.

"WMF achieves an integrated platform for process automation and output management", Internet publication of Redwood Business Solutions—Making complex processes easy to manage; Redwood Software, 2006.

"Order to cash" Internet publication of Wikipedia, the free encyclopedia.

"Microsoft Commerce Server 2000: Scalability Planning", msdn, Internet publication; Microsoft Corporation, Jan. 31, 2001.

"Microsoft Commerce Server 2000: Site Deployment", msdn, Internet publication; Microsoft Corporation, Jan. 31, 2001.

"Baby steps", *Teredata Magazine*, Sep. 2008; Teradata Corporation, AR-5733; pp. 1-4.

"Introduction to Teradata Warehouse", Release V2R6.1 (Teradata Database)/Release 8.1 (Teredata Warehouse), B035-1091-115A, Nov. 2005; pp. 1-2, i-xviii, 1-214.

SAP Central Job Scheduling by Redwood—Solution in Detail, Version 7, Mar. 13, 2006, pp. 1-27.

"Job Scheduling for SAP", by Anjo De Heus, Arnoud Roebers, Kees Verruijt (2006, Hardcover), page from ebay listing of book.

"Customer Success Stories", Internet page from Redwood for Redwood solutions.

"Define: Order to Cash", Internet search page from Google defining phrase, Order to Cash.

Examiner's First Report—AU Patent Office, Related application serial No. 2010/203106.

Search Report and Written Opinion from related Singapore Patent Application No. 201005255-3 dated Feb. 15, 2011.

Matthijs Duitshof: "Workflow Automation in Three Administrative Organisations highlighting Business Process Modeling" Jul. 29, 1994, Master's thesis, University of Twente.

\* cited by examiner

| Dynamic Throttling Control Module 504 | | |
|---|---|---|
| Parameter | Description | Value |
| systemDownTimeErrorCodes | A configured list of error codes that indicate source system and middleware outage. | Predetermined code value |
| maxRetries | Maximum number of retries in the batch process before termination (when the source system is determined to be down). | 3-5 retries |
| sleepDurationBeforeRetry | Number of seconds the batch process should sleep before retrying, when the source system is determined to be down. | 5-10 minutes |

704 — systemDownTimeErrorCodes
706 — maxRetries
708 — sleepDurationBeforeRetry

Figure 7

Dynamic Throttling Control Module 504

| Parameter | Description | Value |
|---|---|---|
| performanceDegradationThreshold | Minimum transaction response time (in seconds) for the performance to be considered degraded. | Computed statically based on historical data or derived dynamically by the batch process by a learning phase that captures statistics. |
| decisionSampleSize | Number of degraded transactions in sequence (with response time exceeding the above threshold) that will trigger termination of the batch process. Same sample size will be used for increasing the throttle if transaction performance exceeds expectations. | At least 10 transactions to avoid preventing termination if the degradation is atypical. |

Figure 8

| | Dynamic Throttling Control Module 504 | |
|---|---|---|
| Parameter | Description | Value |
| goodPerformanceThreshold | Maximum transaction response time (in seconds) for the source system performance to be considered favorable for increasing the throttle. | Computed statically based on historical data or derived dynamically by the batch process through a learning phase that captures statistics. |
| decisionSampleSize | Number of transactions in sequence with response time equal to or below goodPerformanceThreshold, in order to trigger an increase in throttle. | At least 10 transactions to avoid premature increase in throttling if the good performance is atypical. |
| currentlyPendingTransactions | The number of transactions pending completion at the time the decision to increase the throttle is being made. | DYNAMIC (Pending transactions in the database at the time of process startup) minus (number of transactions processed so far). |
| timeToCompletion | The number of seconds left for the batch process to terminate (based on allocated schedulingWindowSize) at the time the decision to increase the throttle is being made. | DYNAMIC (schedulingWindowSize) minus (elapsed time since the startup of execution). |

Figure 9

OPTIMIZATION SYSTEM FOR CONTROLLING BATCH JOB PROCESSING TRAFFIC TRANSMITTED TO A MAINFRAME COMPUTER

BACKGROUND OF THE INVENTION

1. Technical Field

This disclosure relates to membership enrollment processing in a healthcare service organization. In particular, this disclosure relates to optimization of data entry for member information and enrollment processing in a distributed processing center.

2. Background

Enrollment services for the healthcare industry are labor intensive because the primary function of such services involves inputting member data, where data from a member (enrollee) or the employer of the member must be entered into one or more large computing systems, such as a mainframe computing system. Processing of the member data may also be time consuming, particularly if errors are encountered. Currently, the healthcare industry employs a large number of data entry workers at an enrollment center, often located offshore, to manually handle the data entry tasks. An enrollee or the enrollee's employer typically fills out insurance-related paperwork and documentation, and submits the paperwork to the enrollment center. The enrollment center receives the paperwork as a computer document image (or converts the paperwork to an image document, such as a PDF-type document).

Once the data from the enrollee has been entered into a document, the document is transmitted to the mainframe computing system for batch processing. The mainframe computing system typically processes the batch without regard to any additional processing capability that may be directed to the batch process. Also, unavailability of the mainframe system often limits productivity at the enrollment center, because even though the enrollment center may be capable of operating 24 hours per day, the availability of the mainframe computing system may be limited to specific hours.

Further, when the mainframe computing system is down or otherwise unavailable, the enrollment center operations come to a halt. Additionally, it is very difficult to balance the workload, especially during peak times or seasonal periods, such as the end of the year, when workloads are extremely high.

Accordingly, there is a need for a processing system that permits enrollment center operations to continue during periods of time when the mainframe computing system is not operational, permits optimization of the various batch processes, efficiently distributes processing workloads across geographically separate enrollment centers, increases the efficiency of the enrollment center operation, and improves throughput of healthcare-related enrollment forms.

SUMMARY

A system for enrollment processing optimization controls batch job processing traffic transmitted to a mainframe computer. The system includes an enrollment data input operations system operatively coupled to the mainframe computer and configured to provide a universal front end for data entry of enrollment information and to create a plurality of enrollment records based on the enrollment information. A database system stores the enrollment records, and a workflow application module operatively coupled to the database system is configured to manage processing of the enrollment records and manage transmission of the enrollment records to the mainframe computer for batch processing. A batch throttling control module operatively coupled to the workflow application module and to the mainframe computer controls the rate and the number of enrollment records transmitted by the workflow application module to the mainframe computer for batch processing.

A method for enrollment processing optimization that controls batch job processing traffic or records in a distributed system that are transmitted to a mainframe computer is also disclosed. The method includes providing a front end data entry system for data entry of enrollment information, creating enrollment records based on the enrollment information, and storing the enrollment records in a database system. The method manages the processing of the enrollment records and the transmission of the enrollment records to the mainframe computer for batch processing. The method also modulates the rate and the number of enrollment records transmitted to the mainframe computer based on parameters corresponding to execution of the enrollment records by the mainframe computer.

Other embodiments of the systems, methods, features, and their corresponding advantages will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The system may be better understood with reference to the following drawings and the description. The components in the figures are not necessarily to scale, emphasis instead being placed upon illustrating the principles of the invention. Moreover, in the figures, like reference numerals designate corresponding parts throughout the different views.

FIG. 7 illustrates various error-related parameters associated with a dynamic throttling control module;

FIG. 8 illustrates various negative performance-related parameters associated with a dynamic throttling control module;

FIG. 9 illustrates various positive performance-related parameters associated with a dynamic throttling control module.

DETAILED DESCRIPTION OF THE PREFERRED EMBODIMENTS

Figure 1:
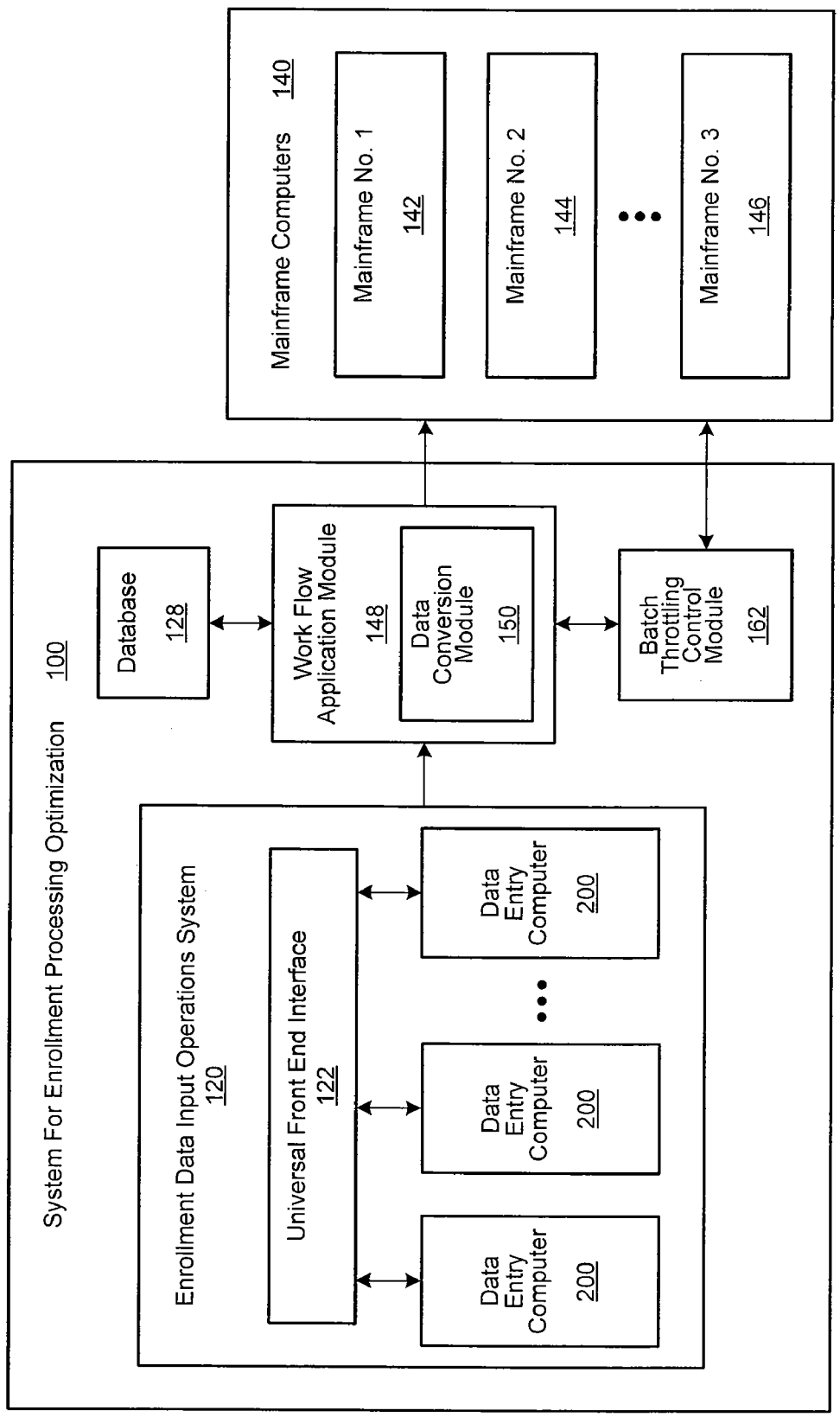
FIG. 1 is a block diagram of an enrollment optimization computing platform and environment.

FIG. 1 is a high-level hardware block diagram of a system for enrollment processing optimization 100 and its surrounding computing environment. The system for enrollment processing optimization 100 may include an enrollment data input operations system 120 operatively coupled to a local or distributed database 128. Multiple databases 128 may be used. The database system 128 may be an SQL Server or an Oracle database system, or other suitable database system. The enrollment data input operations system 120 includes a front end interface 122 that accepts enrollment data from local and remote sources. The front end 122 may, but need not be, universal in the sense that it facilitates or enforces the use of a consistent data entry format across the enrollment data to improve efficiency of the personnel who provide the data input services.

The system for enrollment processing optimization 100 is coupled to one or more mainframe computer systems 140, which may in some embodiments be remotely located from the enrollment data input operations system 120 and/or the system for enrollment processing optimization 100, and which may be operatively coupled via a communications network or Internet pathway. Although some embodiments describe a mainframe computer 140 remotely located from the enrollment data input operations system 120 and from the enrollment processing optimization 100, in other embodiments, the mainframe computer 140 need not be remotely located and instead may be co-located or located in close proximity with the enrollment data input operations system 120 and the system for enrollment processing optimization 100.

The mainframe computer 140 may include, for example, a first mainframe computer 142, a second mainframe computer 144, and a third mainframe computer 146. Any suitable number of mainframe computers 140 may be used depending on the scale of the facility in which they are located and scope of operations. In many facilities, the system for enrollment processing optimization 100 may communicate with a plurality of different mainframe computers 140, each with differing input format requirements.

Note that although the preferred embodiment uses a mainframe computer 140 as described herein, any equivalent or similar computing system may be used, including but not limited to systems executing batch processing jobs, minicomputers of sufficient processing capability, cloud computing facilities, multi-parallel processing systems, or any suitable computing platform.

Figure 3:
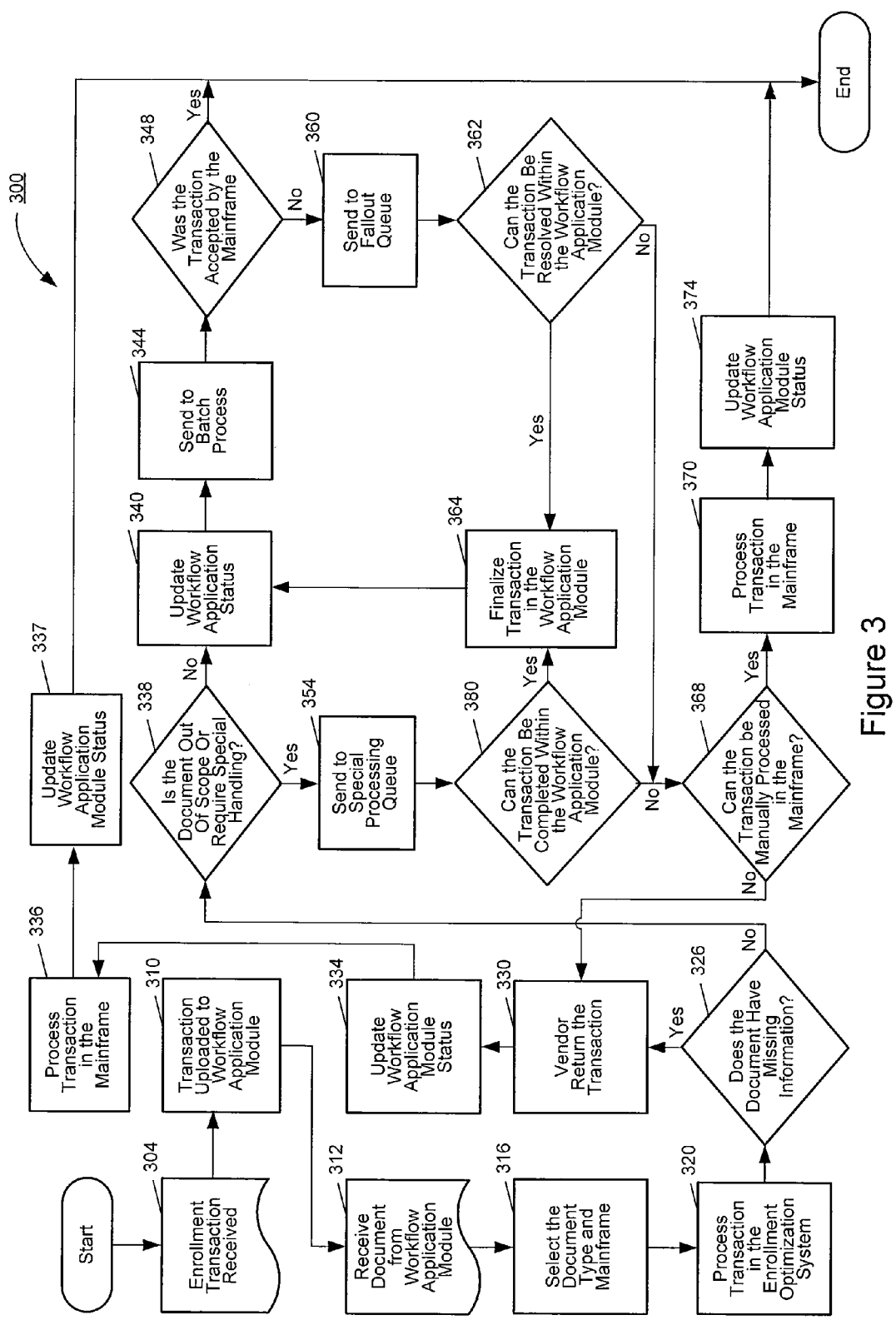
FIG. 3 is a flowchart showing workflow application processing logic in an enrollment center in one specific embodiment.

A workflow application module 148 is operatively coupled to the database 128 and to the enrollment data input operations system 120. The workflow application module 148 is a primary software component of the system for enrollment processing optimization 100, and controls the pertinent processing steps and manages the transmission of the batch jobs to the mainframe computer 140. The logical operation of the workflow application module 148 is shown in FIG. 3 described below. The workflow application module 148 may also include a document conversion module 150 to facilitate conversion of the records into the appropriate format required by the different mainframe computers 140, which may require differing data input formats. Suitable conversion modules may be known commercially available conversion modules implementing XML or other software schema and transformation logic.

Figure 10A:
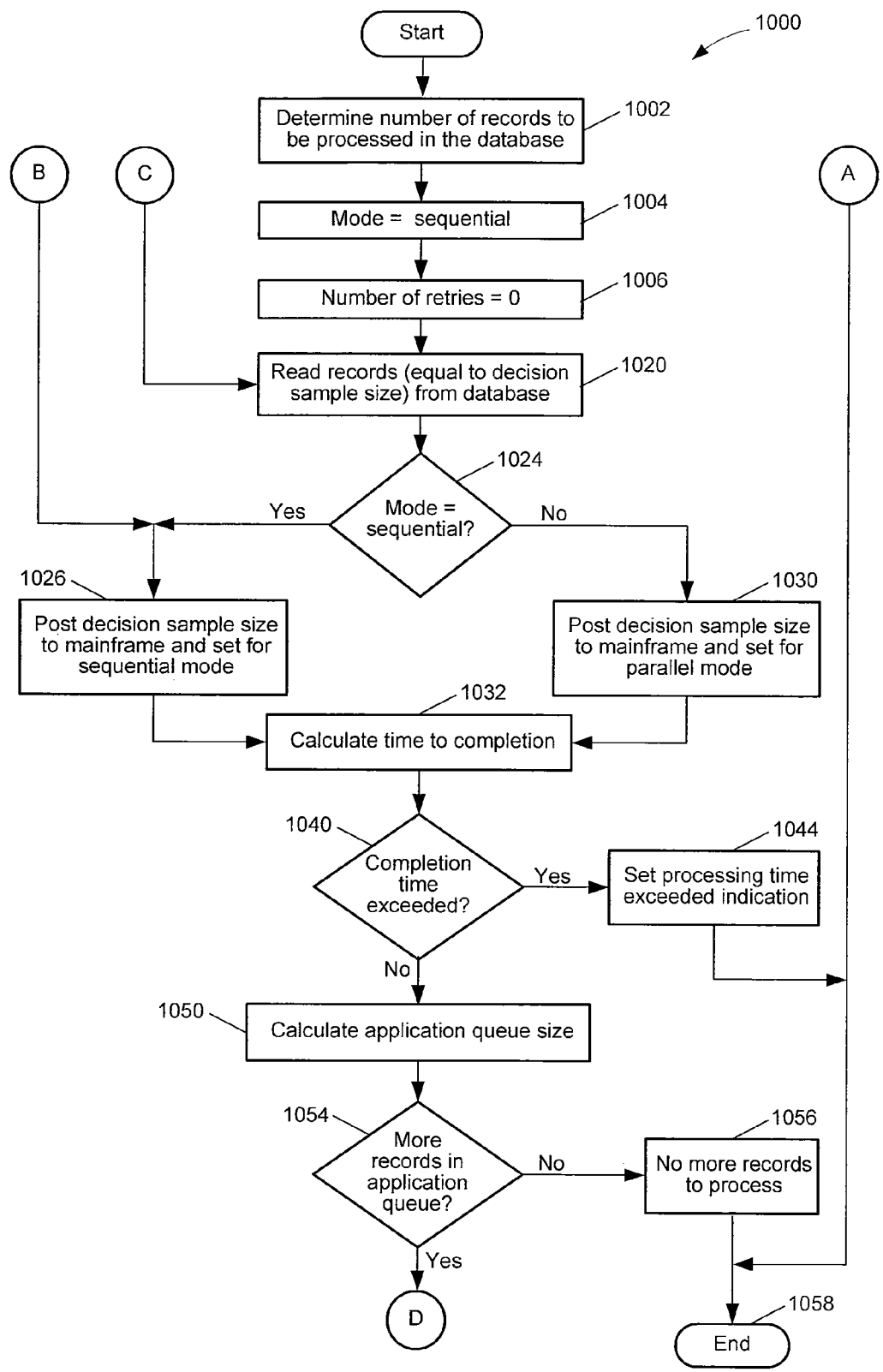
FIGS. 10A and 10B represent a flowchart showing dynamic throttling processing logic.
Figure 10B:
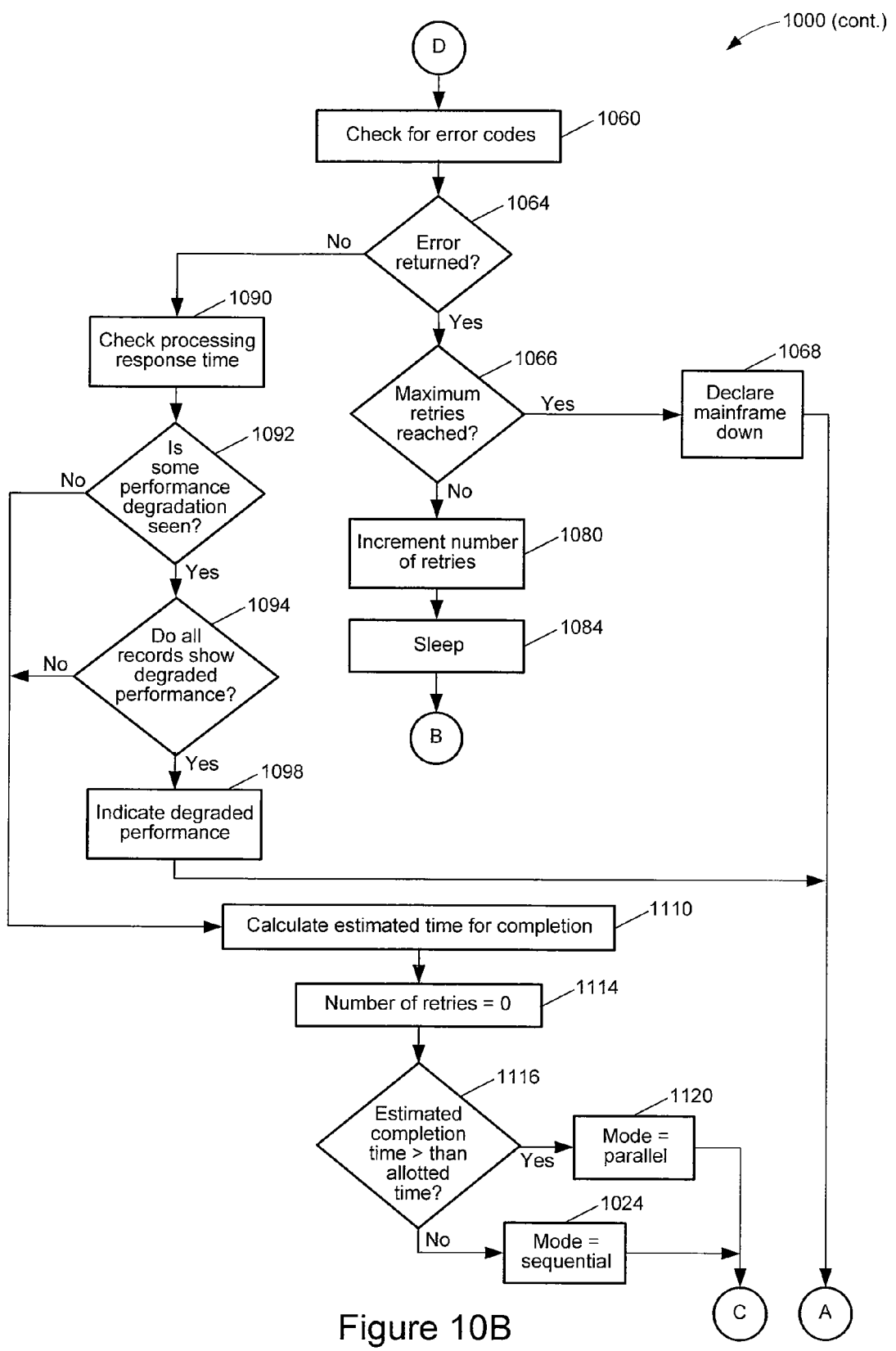

The system for enrollment processing optimization 100 also includes a batch throttling control module 162, which is operatively coupled to the workflow application module 148 and to the mainframe computers 140. The logical operation of the batch throttling control module 162 is shown in FIGS. 10A and 10B. Preferably, the mainframe computers 140 process data in a batch format. A batch or batch job may include multiple records, where each record may represent a paper form or image of a paper form in which data has been entered by the enrollee or an agent for the enrollee. In the environment of the system for enrollment processing optimization 100, such data or image of a paper form represents the enrollment information for a person or family in a healthcare provider organization.

The system for enrollment processing optimization 100 may be embodied as a system cooperating with computer hardware components and/or as computer-implemented methods. The system for enrollment processing optimization 100 may include a plurality of software modules or subsystems. The modules or subsystems, such as the workflow application module 148 and the batch throttling control module 162, may be implemented in hardware, software, firmware, or any combination of hardware, software, and firmware, and may or may not reside within a single physical or logical space. For example, the modules or subsystems referred to in this document and which may or may not be shown in the drawings, may be remotely located from each other and may be coupled by a communication network.

Figure 2:
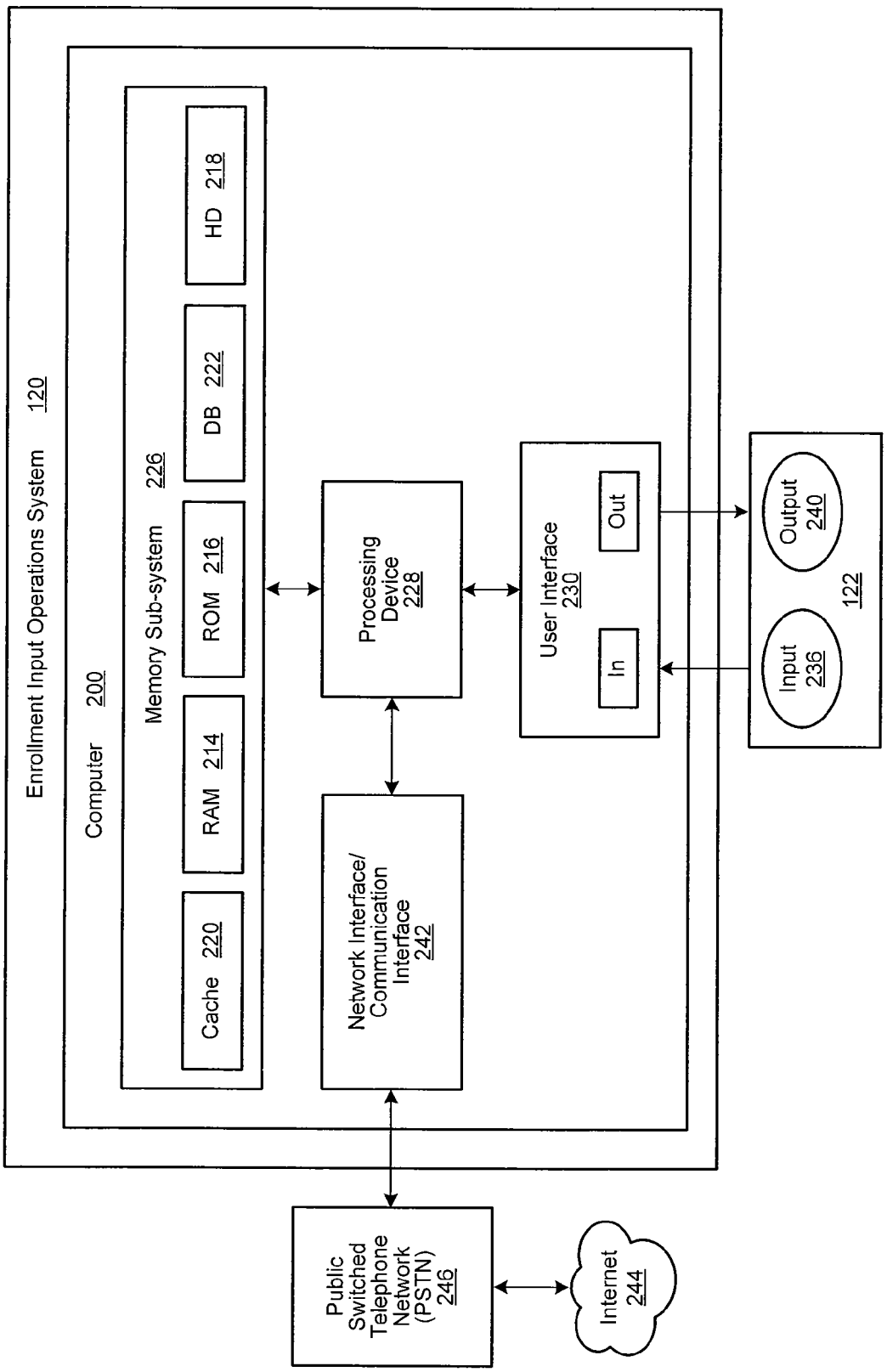
FIG. 2 is a block diagram of an enrollment data input operations system used in data entry operations.

FIG. 2 is a high-level hardware block diagram of an enrollment data input operations system computer 200, which may be part of the enrollment data input operations system 120. The data entry computer 200 may be a personal computer and may include various hardware components, such as RAM 214, ROM 216, hard disk storage 218, cache memory 220, database storage 222, and the like (also referred to as "memory subsystem 226"). The data entry computer 200 may include any suitable processing device 228, such as a computer, microprocessor, RISC processor (reduced instruction set computer), CISC processor (complex instruction set computer), mainframe computer, work station, single-chip computer, distributed processor, server, controller, micro-controller, discrete logic computer, and the like, as is known in the art. For example, the processing device 228 may be an Intel Pentium® microprocessor, x86 compatible microprocessor, or equivalent device, and may be incorporated into a server, a personal computer, or any suitable computing platform.

The memory subsystem 226 may include any suitable storage components, such as RAM, EPROM (electrically programmable ROM), flash memory, dynamic memory, static memory, FIFO (first-in, first-out) memory, LIFO (last-in, first-out) memory, circular memory, semiconductor memory, bubble memory, buffer memory, disk memory, optical memory, cache memory, and the like. Any suitable form of memory may be used, whether fixed storage on a magnetic medium, storage in a semiconductor device, or remote storage accessible through a communication link. A user or system manager interface 230 may be coupled to the data entry computer 200 and may include various input devices 236, such as switches selectable by the system manager and/or a keyboard. The user interface also may include suitable output devices 240, such as an LCD display, a CRT, various LED indicators, a printer, and/or a speech output device, as is known in the art.

To facilitate communication between the data entry computer 200 and external sources, a communication interface 242 may be operatively coupled to the computer system. The communication interface 242 may be, for example, a local area network, such as an Ethernet network, intranet, Internet, or other suitable network 244. The communication interface 242 may also be connected to a public switched telephone network (PSTN) 246 or POTS (plain old telephone system), which may facilitate communication via the Internet 244. Any suitable commercially-available communication device or network may be used.

FIG. 3 is a flowchart showing one embodiment of the logic 300 executed in the enrollment data input operations system 120 and the workflow application module 148. The terms "document" and "transaction" are used interchangeably herein because in this application, the mainframe computers 140 process transactions, which are document-based transactions. First, an enrollment transaction is received (304), typically by the client or vendor, which in some cases is the healthcare insurance company that employs the services of the enrollment center. Each transaction may be in the form of a record, which may be represented by the data shown in a computer document image, such as a PDF-type document or other suitable document image.

The enrollment transaction is then uploaded to the workflow application module 148 (310) by the client or vendor. The client or vendor may be any healthcare provider or vendor, such as WellPoint Corp., Blue Cross/Blue Shield Corp., Aetna Corp., or any other healthcare organization. The workflow application module 148 maintains each document as a record in the database 128 or in a related database management system.

Next, the document is requested and retrieved from the workflow application module 148 (312), and the appropriate mainframe computer 140 is selected to process the document (316). The selected transaction may be processed by one of the plurality of mainframe computers 140 based on the specific configuration of the mainframe computing environment. The document is then processed as a transaction (320).

Note that each mainframe computer 140 may require that the document received be in a specific type of format, and such formats may differ among the multiple mainframe computers (142, 144, 146). Accordingly, the document conversion module 150 of the workflow application module 148 selects the appropriate mainframe computer and converts the document into the appropriate format required by the selected mainframe computer (142, 144, 146).

Each document is then inspected to determine if it is complete or if information is missing (326). If information is missing, the document is returned to the vendor (330) for updating. Once the document has been updated by the vendor and returned, the workflow status is then updated (334). The document is then processed by the mainframe computer 140 (336), the workflow status is updated (337), and processing is deemed completed.

If the document is complete and no information is missing (326), the document is checked to determine if any of the information is out of scope or if the document requires special handling (338). If the document is in an acceptable state, the workflow status is updated (340), and the document is sent to the mainframe computer 140 for batch processing (344). If the mainframe computer 140 accepts and processes the document successfully (348), processing of the form is deemed completed and processing terminates.

If the transaction was not accepted by the mainframe computer 140 (348), the transaction is sent to a fallout queue for additional processing (360). Rejection of the document by the mainframe computer system 140 may be a result of conflicts in the business rules used to process the transaction. For example, a rejection may result if the wrong group number or policy number has been entered into the document or if such policy number or group number has not yet been opened.

The transaction is then retrieved from the fallout queue to determine if the error can be resolved (362). Correction of the error in one specific embodiment may be a manual or a human-assisted operation rather than an automatic operation. Accordingly, human personnel may be needed to determine the corrective action to be applied, if applicable. If the error in the transaction is minor and can be corrected, the transaction is finalized (364) and it is sent back for processing and workflow update (340). If the error cannot be corrected at this stage (362), a decision is made to determine whether the transaction can be manually processed using more experienced personnel or human "experts" to correct the error (368). If the transaction can be corrected manually by the expert, the transaction is processed (370), the workflow status is updated (374), and the processing of the transaction is deemed completed.

If the transaction cannot be manually processed (368), the transaction is sent back to the vendor for modification and/or correction (330). Upon return of the corrected transaction from the vendor, the workflow status is updated (334). If the transaction is out of scope or requires special handling (338), the document is sent to the special processing queue for additional processing (354). Examples of errors that may cause a transaction to be sent to the special processing queue may include entry of a date in an incorrect format, entry of an incorrect ZIP code, or other minor typographical errors. Next, a determination is made to verify that the transaction can be completed (380). If the transaction can be completed, the transaction is finalized (364). If not, the transaction is checked to determine if the transaction can be manually processed (368). The documents are returned to the vendor (330) for correction if the transaction cannot be completed.

Figure 4:
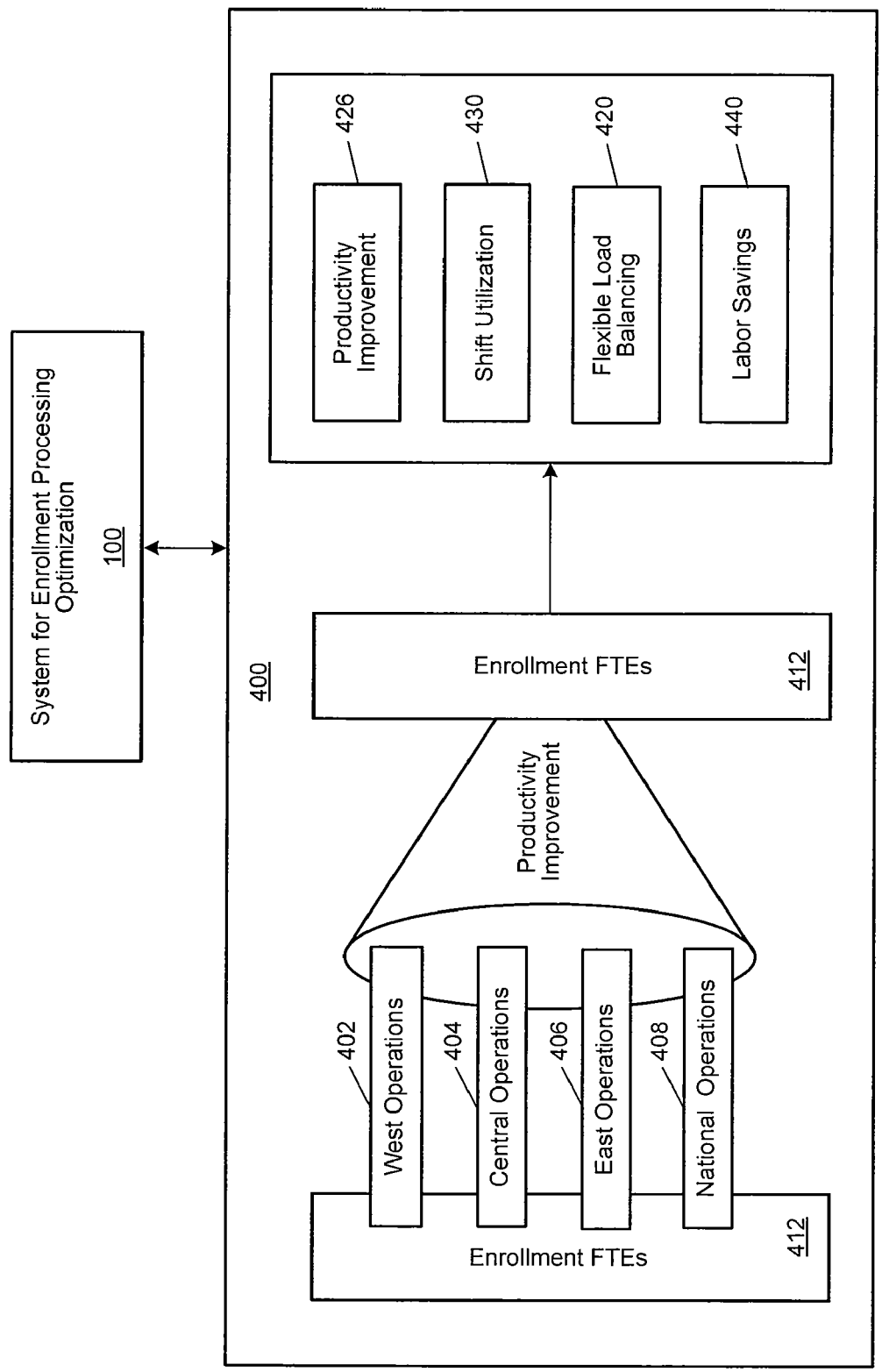
FIG. 4 is a pictorial diagram illustrating the operation of an enrollment center.

FIG. 4 is a pictorial example showing the logical operation of an enrollment center 400, which may utilize the system for enrollment processing optimization 100. As shown in the illustrated example, four separate and geographically diverse enrollment operations facilities may exist that comprise the enrollment center. For example, the enrollment operations facilities may include a west operations facility 402, a central operations facility 404, an east operations facility 406, and a national operations facility 408. The various operations facilities may employ a large number of full-time employees (FTEs) 412.

In one specific example, many hundreds or perhaps thousands of FTEs may be employed, although the number of FTEs may be based on the size and scope of the operation or business. In some embodiments, the enrollment operations facilities or an enrollment center 400 may be located overseas to take advantage of lower labor costs. In some systems not using the system for enrollment processing optimization, use of separate and geographically diverse enrollment centers is inefficient because workload balancing between the various enrollment operations cannot be accomplished. Further, in such enrollment operations centers, when the mainframe computer is down, FTEs are unable to perform data processing, which results in a sharp decrease in productivity.

The system for enrollment optimization 100 may be used to balance the workload 420 across separate and geographically diverse enrollment operations or enrollment centers 400. The system 100 may also be used to improve efficiency and productivity 426 because the FTEs are able to perform the data entry tasks on a continuous basis. Using the system for enrollment processing optimization 100, the FTEs are able to continue working even when the mainframe computer 140 is not operational, is down for maintenance, or when batch processing is not scheduled. This is possible because the data entry operations are buffered and stored in the database 128 and subsequently released to the mainframe computer in 140 under the control of the workflow application module 148 and the batch throttling control module 162. This leads to substantial cost savings through improved productivity, and may also result in a decrease in the number of required FTEs. Further, the system for enrollment optimization 100 increases shift utilization 430 thus reducing labor costs 440.

With respect to batch processing generally, records or transactions are processed in a sequential manner. That is, each record or transaction is fully processed before the next record or transaction is accessed in the batch. However, although the batch is processed in a sequential manner, the various jobs running on the mainframe computer 140 may be processed or serviced in a round-robin approach or time-slice approach along with other mission-critical applications such that the entire batch receives its allotted processing portion, where the individual jobs processed by the mainframe computer 140 are controlled by the operating system of the mainframe computer.

Figure 5:
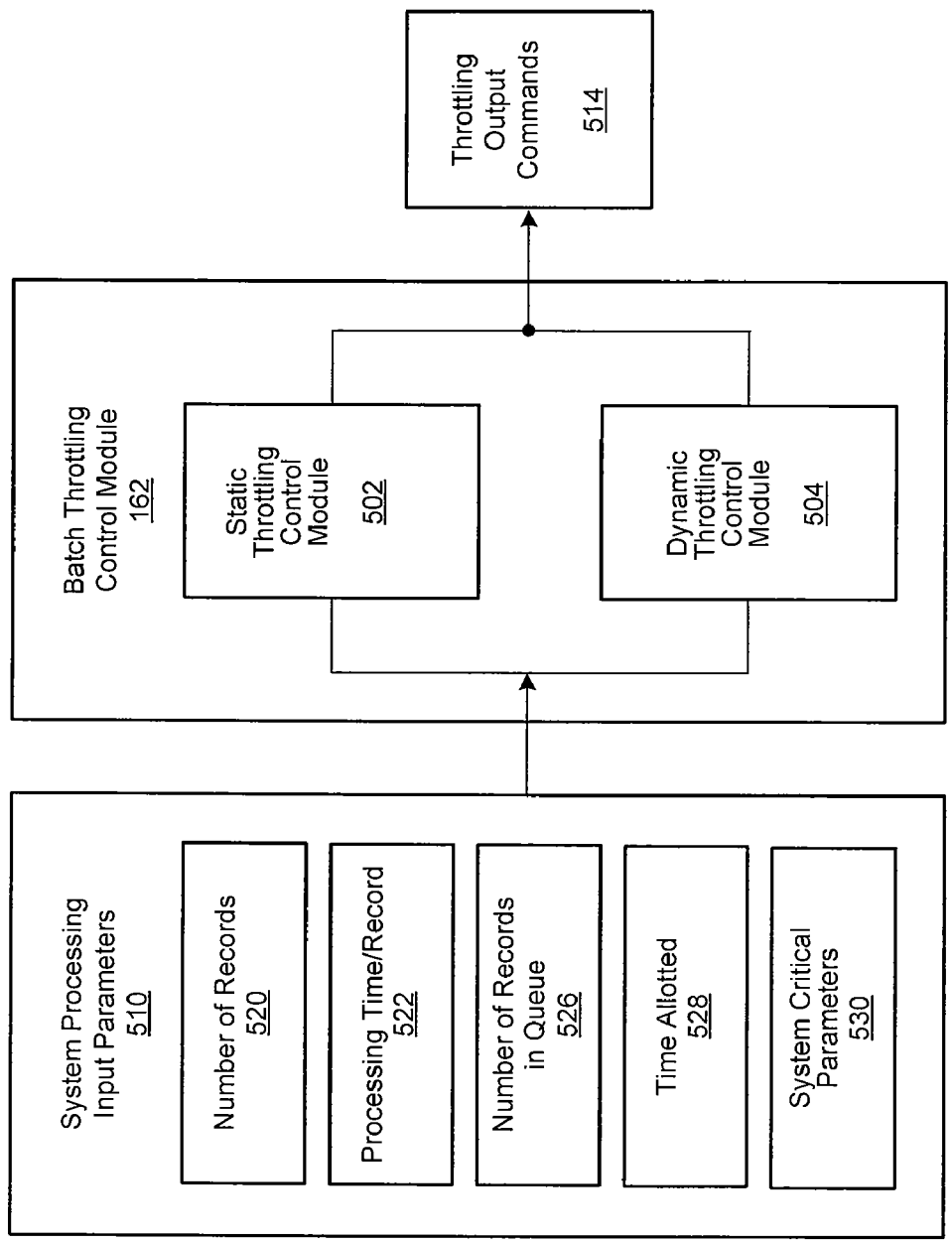
FIG. 5 is a high-level block diagram of a batch throttling control module.

FIG. 5 is a high-level block diagram of the batch throttling control module 162, which includes a static throttling control module 502 and a dynamic throttling control module 504. The logic implementing the dynamic throttling control module 504 is shown in FIGS. 10A and 10B described below. The batch throttling control module 162 receives system input control parameters 510 and provides throttling output commands 514 to control how batch processing within the workflow application module 148 adapts the transmission of batches records] to the mainframe computer 140 for execution. The system input control parameters 510 inform the batch throttling control module 162 about the state of the batch processing. The system input parameters 510 include: a number of records being processed 520, a processing time per record 522, a number of records remaining in the various queues 526, a time allotted for batch processing 528, and other system critical parameters 530. Although batch processing is typically a sequential operation, parallel batch processing threads may be spawned by the workflow application module 148 to permit the mainframe computer 140 to process multiple records if excess processing capability is available, as discussed later.

Batch throttling control within the workflow application module 148 modulates the workload from the enrollment data input operations system 120. Modulation increases predictability of the system and prevents a large number of records from being released for batch processing in a relatively short period of time. This could adversely impact processing of the batch files and/or performance of other mission-critical applications that the mainframe computer 140 may be handling because the mainframe computer does not distinguish the source of the records that it receives for processing. In other words, it is usually the case that the mainframe computer 140 cannot limit the input from a particular source. Accordingly, if one particular application, such as the workflow application module 148, were to overload the mainframe computer and fill the input queue of the mainframe computer 140, the mainframe computer may neglect to perform other important or critical applications.

In one embodiment of the system for enrollment optimization 100, static throttling may be set as a default condition used to initially control and track system processing workflow through the workflow application module 148. Static throttling schedules batch processes based on the availability of computing capacity in the mainframe computer 140 at specific times during the day.

Figure 6:
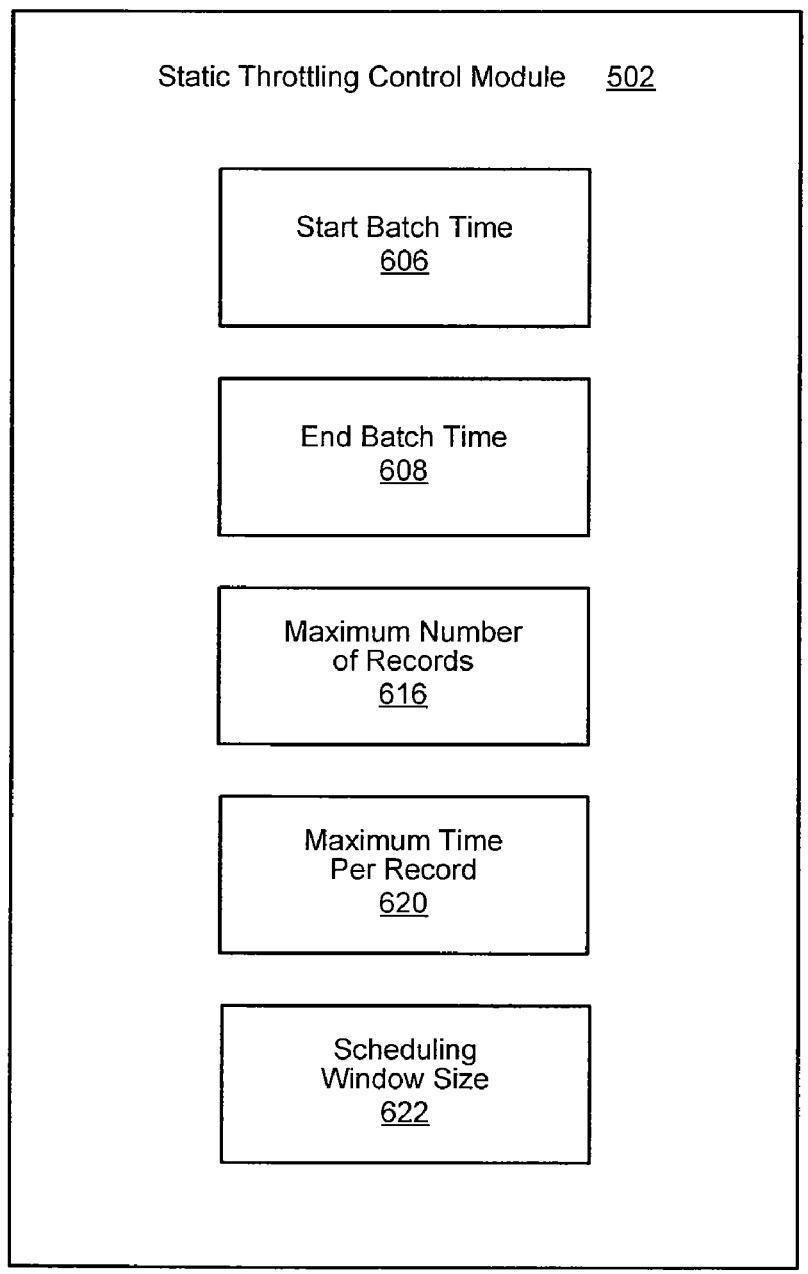
FIG. 6 illustrates various parameters associated with a static throttling control module.

FIG. 6 shows exemplary input parameters used by the static throttling control module 502, including: a batch start time 606, a batch end time 608, a maximum number of records to process 616, a maximum processing time per record 620, and a scheduling window size 622. In general, static throttling utilizes off-peak batch scheduling whenever possible to utilize available processing capacity. Even if there is no significant idle time for processing in the mainframe computer 140, static throttling attempts to evenly distribute scheduling of batch records to the mainframe computer 140.

With respect to the start of batch time 606 and the end of batch time 608, system personnel or other personnel tasked supervising the mainframe computer 140 may mandate, for example, that the batch be run from 9:00 AM to 11:00 AM, and only during that time. Accordingly, the batch start time 606 and the batch end time 608 determine exactly when the batch is to be processed.

With respect to the maximum number of records 616, if the enrollment data input operations system 120 generates a greater number of records or transactions than is allowed to be sent to the mainframe computer 140 per the maximum number of records parameter 616, excess records may be held in an excess pending queue to be transmitted to the mainframe computer 140 and processed at a later time. Because this form of throttling is static in nature, the static throttling control module 502 does not vary the batch processing parameters to accommodate the excess records held in the queue. As such, the transactions held in the excess pending queue are processed in due course when processing capability is available by the mainframe computer 140.

If the processing time for any single record or transaction exceeds the amount of processing time specified by the maximum processing time per record 620, the transaction may be terminated or returned to an error queue to determine if a problem exists. The scheduling window size parameter 622 defines the number of seconds in which a batch process is available for execution, and may be dependent upon the type of mainframe computer 140 or other computer used in the system.

Turning now to the dynamic throttling control module 504, this module evaluates certain runtime and static parameters of the mainframe computer 140 to determine the appropriate execution or transmission rate of the batch records sent to the mainframe computer 140, thus modulating the workflow. Dynamic throttling reacts to the actual real-world source system or mainframe computer 140 performance that is monitored during execution, and detects runtime behavioral problems experienced by the mainframe computer 140.

Dynamic throttling prevents or reduces the backup of processing queues as a result of continued transaction traffic when the mainframe computer 140 is not available or if the mainframe computer 140 is experiencing degraded performance. When additional processing capacity is available from the mainframe computer 140, dynamic throttling can increase batch processing efficiency by spawning additional concurrent threads to be processed by the mainframe computer 140. Spawning additional concurrent threads instructs the mainframe computer 142 to operate as a parallel processing machine, consuming some or all of the additional processing capacity. Accordingly, the batch throttling control module 162 may increase or decrease the execution rate of batch records, or may keep the execution rate unchanged, depending on the runtime parameters evaluated and the particular rules applied.

With respect to distributed processing embodied in the system for enrollment processing optimization 100, and in particular, within the workflow application module 140, the dynamic throttling control is applied at the batch scheduling level in the distributed system, which is prior to when the batch records are transmitted to the mainframe computer 140. The dynamic throttling module 504 functions with respect to each particular distributed process. The dynamic throttling module 504 thereby controls the amount of data sent to the mainframe computer 140.

The dynamic throttling module 504 reacts to input parameters describing the operation of the mainframe computer 140. In one implementation, the dynamic throttling module 504 may consider three processing conditions, namely: 1) when the mainframe computer 140 is down, 2) when the mainframe computer 140 is providing degraded performance, and 3) when the mainframe computer 140 is providing better-than-expected performance.

FIGS. 7-9 describe exemplary input parameters that the dynamic throttling module 504 evaluates in order to control the batch process in the workflow application module 148 in accordance with the three above-described processing conditions. The input parameters shown in FIG. 7 represent error codes used to determine if the mainframe computer 140 is down. If there is a severe problem with the mainframe computer 140, the dynamic throttling module 504 may terminate the entire batch job, and may determine that no further records should be sent to the mainframe computer 140.

The input parameter "system downtime error codes" 704 represents error codes that describe the nature of the mainframe computer 140 error. The input parameter "maximum number of retries" 706 represents the number of attempts to process a certain number of batches before declaring an error, and is typically set at between three and five retries. Thus, if a single error is returned after an attempt to execute the transaction, a system failure is not necessarily declared. Rather, the maximum number of retries must first be exceeded before the dynamic throttle control module 504 declares that the mainframe computer 140 is down. In that regard, it is possible to receive a transaction failure error due to network latency or network fluctuations, which do not represent true system errors. The input parameter "sleep duration before retry" 708 represents the number of seconds or minutes between execution attempts, which is typically between five and ten minutes.

The input parameters shown in FIG. 8 represent how the dynamic throttling control module 504 handles a degradation in performance of the mainframe computer 140. When the processing ability of the mainframe computer 140 is degraded, the dynamic throttling control module 504 reduces the number of batch transactions or the rate of batch traffic sent to the mainframe computer 140. Such dynamic throttling helps ensure that an external process, such as the workflow application module 148, does not overload the mainframe computer 140.

The input parameter "performance degradation threshold" 804 represents a period of time in which a transaction should typically be processed, and if that time is exceeded, the dynamic throttling control module 504 may deem the processing of the mainframe computer 140 as degraded. Typically, the range of this input parameter is between about 15 seconds to 20 seconds. The time in which the transaction should be processed means the "round-trip" or total time from when the record is placed into the system to the time when a response is received from the mainframe computer 140.

When the performance degradation threshold value 804 is exceeded, the dynamic throttling control module 504 declares that the performance of the mainframe computer 140 is degraded. The performance degradation threshold value 804 may be modified dynamically in real-time based upon real world circumstances. Degradation may occur because of hardware failures in the mainframe computer 140, such as loss of a processing a core, loss of RAM, loss of file space or disk space, or other hardware-related problems. Processing degradation may occur because other high priority jobs, unrelated to this batch job, may be taking priority, such as billing programs, accounts receivable programs, and claims processing programs, which are all executed on a mainframe computer 140.

The input parameter "decision sample size" 806 represents the number of transactions or records that are evaluated before the dynamic throttling control module 504 declares that performance is degraded. In that regard, the delay of processing of a single record may not constitute a performance degradation because one or more false positive identifications may occur. Typically, at least 10 transactions must appear degraded before a true performance degradation is declared. If a performance degradation condition is declared, the dynamic throttling control module 504 reduces the processing rate expected for the records, and reduces the number of transactions sent to the mainframe computer 140.

The input parameters shown in FIG. 9 represent how the dynamic throttling control module 504 handles better-than-expected performance from the mainframe computer 140. When performance is better than anticipated, the dynamic throttling control module 504 may perform upward throttling to increase the rate of processing of the transactions in the batch, thus more transactions are sent to the mainframe computer 140 per unit of time.

The input parameter "good performance threshold" 904 represents a low end of an optimistic value that indicates better-than-expected performance from the mainframe computer 140. This input parameter is a lower value of performance threshold, and may be in the range of between about 8 seconds and 10 seconds. Accordingly, if transactions are processed in less than 8 seconds, better-than-anticipated performance is declared, and the dynamic throttling control module 504 may increase the processing rate or transmission volume of the batch records to the mainframe computer 140.

The input parameter "decision sample size" 906 represents a predefined number of samples or transactions that must surpass the good performance threshold before the dynamic throttling control module 504 increases the processing rate. This value may range between about 8 to 10 transactions. In other words, merely because better-than-expected performance occurs with one or two records does not necessarily indicate that the dynamic throttling control module 504 should increase the processing rate.

The input parameter "current pending transaction" 908 represents the number of records or transactions in the batch that are waiting to be processed. These transactions may be held in a predetermined queue. The dynamic throttling control module 504 may evaluate this number when determining whether to increase the processing rate of the batch or maintain the processing rate at its current level. For example, if there are 100 records in the batch queue of the mainframe computer 140, 60 minutes may be allocated in which to process all of the 100 records.

Further, based on historical and other real-world conditions, the dynamic throttling control module 504 may receive an input or otherwise determine that only 30 minutes is required to process the 100 records. Accordingly, in this situation, even though the mainframe computer 140 is providing better-than-anticipated processing capability, the dynamic throttling control module 504 may nonetheless maintain the batch processing rate at its current level without upward throttling because all of the records will be processed in the allotted time.

Conversely, for example, there may be 200 records in the batch queue of the mainframe computer 140, and based on historical and other real-world conditions, the dynamic throttling control module 504 may ascertain that only 100 of the transactions can be processed in the allotted 60 minutes of processing time. In this case, assuming that the mainframe computer 140 is providing better-than-anticipated processing capability, the dynamic throttling control module 504 may increase the rate of processing of the batch transactions, thus effecting upward throttling.

To accomplish upward throttling, transactions or records may be sent to the mainframe computer 140 at a more rapid rate, or alternatively, additional processing threads may be spawned. Spawning additional threads causes the mainframe computer 142 to process records in a parallel fashion. For example, the workflow application module 148 may simultaneously send 10 records to the mainframe computer 140 with an indication that such records should be processed in parallel. Of course, this requires additional computing power, but the results of previously processed records indicate that additional computer capacity is available.

The input parameter "time to completion" 910 represents the amount of time remaining in which to completely process all the transactions in the batch. This value is calculated based upon the average response time per transaction multiplied by the number of pending transactions in the batch queue.

The above described input parameters shown in FIGS. 7-9 facilitate the dynamic throttling control module 504 to control how the batch transactions are transmitted to the mainframe computer 140 with respect to processing rate and transaction traffic flow. Note that the batch processing job ("the enrollment batch job") corresponding to the system for enrollment processing optimization 100 may not be the only job that is executing on a mainframe computer 140. In that regard, the mainframe computer 140 typically handles many varied processes and transactions ("jobs"), where the enrollment batch processing job is but one of many transaction jobs executing on the mainframe computer 140.

Accordingly, the dynamic throttling control module 504 implements the logic specific to the enrollment batch job to ensure efficient and timely processing of the enrollment batch job by monitoring in real time the various parameters and performance associated with the execution of each record or transactions in the enrollment batch job. In that regard, the dynamic throttling control module 504 may inspect the input parameters periodically or may check the input parameters after each individual transaction or record or group of transactions or records has been executed by the mainframe computer 140 so that system responses can be optimized on a transaction-by-transaction basis.

FIGS. 10A and 10B show the logic flow 1000 of the dynamic throttling control module 504. First, the number of pending records to be processed in the database is determined (1002), and initial variables are set. For example, processing is set to "sequential" mode indicating that processing in the mainframe computer will be performed as a sequential process (1004), and the "number of retries" is set to zero (1006).

A variable representing the "decision sample size" for the number of pending records in the database to be processed is read from system configuration parameters and the records are read from the database (1020). The decision sample size represents the number of records or transactions that must all pass a certain condition in order to trigger another condition.

If processing is set to "sequential" mode (1024), then the decision sample size corresponding to the number of records to be processed in the database is transmitted to the mainframe computer, and sequential processing by the mainframe computer is requested (1026) for the number of records defined by the "decision sample size."

If processing is not set to "sequential" mode (1024), then "parallel" mode processing is assumed, and the decision sample size corresponding to the number of records to be processed in the database is transmitted to the mainframe computer, and parallel processing by the mainframe computer is requested (1030) for the number of records defined by the "decision sample size."

Thus, the dynamic throttling control module 504 can direct the mainframe computer to process the records in either a sequential manner or a parallel manner. If the mainframe computer is directed to process the records in a parallel manner, then multiples threads are spawned and processed simultaneously by the mainframe computer. The dynamic throttling control module 504 will only request parallel processing by the mainframe computer if the processing performance of the mainframe computer meets certain criteria.

Next, the "time to completion" is calculated (1032). The "time to completion" is calculated as the "scheduled window size" (in units of time) minus the elapsed time since execution of the batch began. For example, if the "scheduled window size" is two hours and batch processing has consumed 10 minutes of processing time, then the "time to completion" is one hour and 50 minutes, which represents the amount of time left in which to complete execution of the batch.

The "time to completion" is then checked to see if the value is zero or has been exceeded (1040), meaning that batch processing is taking more time than has been allotted. If the value is less than or equal to zero, an indication is set to inform the dynamic throttling control module 504 that processing is running over budget (1044), and processing exits (1058).

If the batch is not running over the allocated processing time (1040), then the application queue size is calculated (1050). The application queue size is calculated as the value of the previous application queue size minus the value of the decision sample size. For example, the decision sample size may be equal to 10 records, and the application queue size may be equal to 100 records. The decision sample size of 10 is subtracted from the application queue size indicating that 10 records have been processed, thus only 90 records remain to be processed by the mainframe computer 140.

If there are no more pending records to be processed, as indicated by an application queue size equal to zero (1054), an indication is set to inform the workflow application module 148 that there are no more records to be processed (1056), and processing exits (1058). If the application queue size is not equal to zero (1054), then the error codes are checked (1060) to determine if errors were detected during the processing of the records, the number of which is based on the value of the "decision sample size."

If a system down error code has been returned (1064), which indicates that the mainframe computer is down, then the number of retry attempts is checked (1066) to determine if the number of retry attempts is greater than the maximum value allowed. If the number of retry attempts has been exceeded, the mainframe computer is deemed to be down, an indication is set (1068), and processing exits (1058).

If the maximum number of retry attempts has not been exceeded (1066), which indicates that the error code returned may not represent a true error, then the number of retries is incremented by one (1080), processing waits for a predetermined period of time (1084), for example, a few milliseconds, and processing then returns to step 1026 to continue processing the batch records.

If no error codes were returned (1064), the processing response time for processing all the records defined by the "decision sample size" is checked (1090). If some of the records defined by "decision sample size" indicate that the records exhibited degraded performance (1092), then a determination is made to see if all of the records defined by the "decision sample size" indicate that processing has exceeded a performance degradation threshold (1094).

If all the records defined by the "decision sample size" indicate degraded performance by the mainframe computer, an indication is then set to inform the dynamic throttling control module 504 that the mainframe computer is operating at a degraded performance level (1098), and processing exits (1058). Once the indication of degraded performance has been set and processing exits, the dynamic throttling control module 504 can then determine the different throttling actions that may be taken to account for the degraded performance of the mainframe computer 140. If only some of the records, but not all the records exhibit degraded performance (1094), processing branches to calculate an estimated time for completion (1110).

If none of the records defined by the "decision sample size" exhibit degraded performance (1092), the estimated time for completion is calculated (1110). The estimated time for completion is calculated based on the number of records remaining in the queue multiplied by the sum of the response times. Next, the number of retries is initialized to zero (1114). If the estimated time to completion is greater than the remaining allocated time for completion of the records in the queue (1116), processing is set to "sequential" mode (1120), and processing branches to step 1020 to continue processing the batch records.

If the estimated time to completion is not greater than the remaining allocated time for completion of the records in the queue (1116), processing is set to "sequential" mode (1124). If the estimated time to completion is greater than the remaining allocated time for completion of the records in the queue (1116), processing is set to "parallel" mode (1120), which mandates that because the mainframe computer provided better-than-expected processing performance, the next iteration of processing should be performed in a parallel mode. Processing then branches to step 1020.

The logic, circuitry, and processing described above may be encoded or stored in a machine-readable or computer-readable medium such as a compact disc read only memory (CDROM), magnetic or optical disk, flash memory, random access memory (RAM) or read only memory (ROM), erasable programmable read only memory (EPROM) or other machine-readable medium as, for examples, instructions for execution by a processor, controller, or other processing device.

The medium may be implemented as any device that contains, stores, communicates, propagates, or transports executable instructions for use by or in connection with an instruction executable system, apparatus, or device. Alternatively or additionally, the logic may be implemented as analog or digital logic using hardware, such as one or more integrated circuits, or one or more processors executing instructions; or in software in an application programming interface (API) or in a Dynamic Link Library (DLL), functions available in a shared memory or defined as local or remote procedure calls; or as a combination of hardware and software.

In other implementations, the logic may be represented in a signal or a propagated-signal medium. For example, the instructions that implement the logic of any given program may take the form of an electronic, magnetic, optical, electromagnetic, infrared, or other type of signal. The systems described above may receive such a signal at a communication interface, such as an optical fiber interface, antenna, or other analog or digital signal interface, recover the instructions from the signal, store them in a machine-readable memory, and/or execute them with a processor.

The systems may include additional or different logic and may be implemented in many different ways. A processor may be implemented as a controller, microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instructions may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system for enrollment processing optimization for controlling batch job processing traffic transmitted to a mainframe computer, comprising:
   an enrollment data input operations system operatively coupled to the mainframe computer and configured to provide a front end for data entry of enrollment information, and configured to create a plurality of enrollment records based on the enrollment information;
   a database storage system configured to store the plurality of enrollment records;
   a workflow application module operatively coupled to the database system configured to manage processing of the plurality of enrollment records, and direct transmission of the enrollment records to the mainframe computer for batch processing;
   a batch throttling control module operatively coupled to the workflow application module and to the mainframe computer, and configured to control a transmission rate and the number of enrollment records transmitted by the workflow application module to the mainframe computer for batch processing, wherein the batch throttling control module includes a static throttling control module and a dynamic throttling control module; and
   wherein the dynamic throttling control module downwardly modulates workflow transmitted to the mainframe computer if a completion time for processing a predetermined number of enrollment records is greater than a predetermined value for each of the enrollment records processed.

2. The system of claim 1, wherein the batch throttling control module controls the processing of the plurality of records in a distributed processing environment.

3. The system of claim 1, wherein the batch throttling control module is configured to modulate workflow transmitted to the mainframe computer for batch processing.

4. The system of claim 3, wherein the workflow is modulated by increasing and/or decreasing the number of records and the rate at which the records are transmitted to the mainframe computer for batch processing.

5. The system of claim 1, wherein the dynamic throttling control module upwardly modulates workflow transmitted to the mainframe computer if a completion time for processing a predetermined number of enrollment records is greater than a predetermined value for each of the enrollment records processed.

6. The system of claim 1, wherein the dynamic throttling control module decreases batch processing traffic transmitted to the mainframe computer upon determining that the processing rate of the batch job by the mainframe computer is less than a predetermined value.

7. The system of claim 1, wherein the dynamic throttling control module receives input parameter values corresponding to execution of individual enrollment records by the mainframe computer.

8. The system of claim 7, wherein the input parameter values include an execution time for each enrollment record and a number of the records processed.

9. The system of claim 1, wherein the mainframe computer includes a plurality of mainframe computers.

10. The system of claim 1, wherein each enrollment record corresponds to data contained in an image of an enrollment form.

11. The system of claim 1, wherein the mainframe computer processes transactions in batch mode.

12. The system of claim 1, wherein the enrollment data input operations system permits the creation of the enrollment records and entering of the enrollment records into the database when the mainframe computer is not operational.

13. The system of claim 1, wherein the enrollment data input operations system is remotely located from the mainframe computer.

14. The system of claim 1, wherein the data input operations system is operatively coupled to the mainframe computer by a communication network and/or the Internet.

15. A system for enrollment processing optimization for controlling batch job processing traffic transmitted to a mainframe computer, comprising:
an enrollment data input operations system operatively coupled to the mainframe computer and configured to provide a universal front end for data entry of enrollment information, and to create a plurality of enrollment records based on the enrollment information;
a database system configured to store the plurality of enrollment records;
a workflow application module operatively coupled to the database system and configured to manage processing of the plurality of enrollment records, and manage transmission of the enrollment records to the mainframe computer for batch processing;
a dynamic batch throttling control module operatively coupled to the workflow application module and to the mainframe computer, and configured to modulate a rate and the number of enrollment records transmitted to the mainframe computer based on parameter values corresponding to execution of enrollment records by the mainframe computer, wherein the batch throttling control module includes a static throttling control module and a dynamic throttling control module; and
wherein the dynamic throttling control module downwardly modulates workflow transmitted to the mainframe computer if a completion time for processing a predetermined number of enrollment records is greater than a predetermined value for each of the enrollment records processed.

16. A method for enrollment processing optimization for controlling batch job processing traffic in a distributed system that is transmitted to a mainframe computer, comprising the steps of:
providing a universal front end data entry system for data entry of enrollment information;
creating a plurality of enrollment records based on the enrollment information;
storing the plurality of enrollment records in a database system;
managing the processing of the plurality of enrollment records, and transmitting the enrollment records to the mainframe computer for batch processing; and
modulating the rate and the number of enrollment records transmitted to the mainframe computer based on parameters corresponding to execution of the enrollment records by the mainframe computer, wherein modulating the rate includes statically throttling and dynamically throttling; and
dynamically throttling to downwardly modulate workflow transmitted to the mainframe computer if a completion time for processing a predetermined number of enrollment records is greater than a predetermined value for each of the enrollment records processed.

17. The method of claim 16, wherein the modulation is performed according to dynamic conditions based upon execution parameters of the enrollment records.

18. The method system of claim 16, wherein managing the processing of the enrollment records and modulating the rate and the number of enrollment records transmitted to the mainframe computer are performed in a distributed computing environment.

19. A system for enrollment processing optimization for controlling batch job processing traffic transmitted to a mainframe computer, comprising:
an enrollment data input operations system operatively coupled to the mainframe computer and configured to provide a front end for data entry of enrollment information, and configured to create a plurality of enrollment records based on the enrollment information;
a database storage system configured to store the plurality of enrollment records;
a workflow application module operatively coupled to the database system configured to manage processing of the plurality of enrollment records, and direct transmission of the enrollment records to the mainframe computer for batch processing;
a batch throttling control module operatively coupled to the workflow application module and to the mainframe computer, and configured to control a transmission rate and the number of enrollment records transmitted by the workflow application module to the mainframe computer for batch processing, wherein the batch throttling control module includes a static throttling control module and a dynamic throttling control module; and
wherein the dynamic throttling control module upwardly modulates workflow transmitted to the mainframe computer if a completion time for processing a predetermined number of enrollment records is greater than a predetermined value for each of the enrollment records processed.

20. A system for enrollment processing optimization for controlling batch job processing traffic transmitted to a mainframe computer, comprising:
an enrollment data input operations system operatively coupled to the mainframe computer and configured to provide a front end for data entry of enrollment information, and configured to create a plurality of enrollment records based on the enrollment information;
a database storage system configured to store the plurality of enrollment records;
a workflow application module operatively coupled to the database system configured to manage processing of the plurality of enrollment records, and direct transmission of the enrollment records to the mainframe computer for batch processing;
a batch throttling control module operatively coupled to the workflow application module and to the mainframe computer, and configured to control a transmission rate and the number of enrollment records transmitted by the workflow application module to the mainframe computer for batch processing, wherein the batch throttling control module includes a static throttling control module and a dynamic throttling control module; and wherein the dynamic throttling control module decreases batch processing traffic transmitted to the mainframe computer upon determining that the processing rate of the batch job by the mainframe computer is less than a predetermined value.

* * * * *